United States Patent
Maes (10) Patent No.: US 7,209,734 B2
(45) Date of Patent: Apr. 24, 2007

(54) VIRTUAL MOBILE SERVICE PROVIDER

(75) Inventor: Stephane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 353 days.

(21) Appl. No.: 10/883,116

(22) Filed: Jun. 30, 2004

(65) Prior Publication Data

US 2004/0266388 A1    Dec. 30, 2004

Related U.S. Application Data

(60) Provisional application No. 60/484,115, filed on Jun. 30, 2003.

(51) Int. Cl.
    *H04Q 7/20*     (2006.01)
(52) U.S. Cl. .................. 455/414.1; 455/414.4
(58) Field of Classification Search ............ None
    See application file for complete search history.

(56) References Cited

U.S. PATENT DOCUMENTS

| | | |
|---|---|---|
| 5,850,517 A | 12/1998 | Verkler et al. |
| 6,157,941 A | 12/2000 | Verkler et al. |
| 6,374,305 B1 | 4/2002 | Gupta et al. |
| 2002/0087674 A1 | 7/2002 | Guilford et al. |
| 2002/0178122 A1 | 11/2002 | Maes |
| 2002/0184373 A1 | 12/2002 | Maes |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0023953 A1 | 1/2003 | Lucassen et al. |
| 2003/0046316 A1 | 3/2003 | Gergic et al. |
| 2004/0199649 A1* | 10/2004 | Tarnanen et al. ......... 709/230 |

OTHER PUBLICATIONS

Maes, Stephanie, Multi-modal Web IBM Position W3C/WAP Workshop, IBM Research Human Language Technologies, downloaded http://www.w3.org on May 26, 2003, 9 pages.
Maes, Stephanie, Multi-modal Browser Architecture, Overview on the support of multi-modal browsers in 3GPP, IBM Research Mobile Speech Solutions and Conversational Multi-modal Computing, downloaded http://www.w3.org on May 26, 2003, 25 pages.
Sundsted, Todd E., With Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

(Continued)

*Primary Examiner*—Erika A. Gary
(74) *Attorney, Agent, or Firm*—Townsend & Townsend & Crew LLP (57) ABSTRACT

Methods and systems are disclosed for a virtual mobile service provider. In one embodiment, a method comprises providing a first mobile service enabler for a first mobile service, the mobile service enabler having a first interface using a first format for communicating with a first set of content providers; and providing a second mobile service enabler for a second mobile service, the second mobile service enabler having a second interface using the first format for communicating with a second set of content providers. The method further comprises providing a plurality of drivers, each of the drivers configured to adapt communications received from the first and second mobile service enablers to a wireless network communications format associated with a wireless network access provider in communications with the respective driver.

22 Claims, 6 Drawing Sheets

OTHER PUBLICATIONS

Single Sign on Deployment Guide, Introduction to Single-Sign-On, Netscape 6 Documentation Training Manual hhtp://developer.netscape.com/docs/manuals/security/SSO/sso.htm on May 26, 2003, 5 pages.

Liberty Architecture Overview, Liberty Alliance Project Version 1.1, Piscataway New Jersey, Jan. 15, 2003, 44 pages.

Parlay APIs 4.0, Parlay X Web Services White Paper, The Parley Group: Parlay X Working Group, Dec. 16, 2002, 12 pages.

* cited by examiner

VIRTUAL MOBILE SERVICE PROVIDER

CROSS-REFERENCES TO RELATED APPLICATIONS

This application claims the benefit of U.S. Provisional Application No. 60/484,115 entitled "Virtual Mobile Service Provider", filed Jun. 30, 2003, which is incorporated herein by reference.

BACKGROUND OF THE INVENTION

The present invention relates generally to mobile applications and mobile services. More specifically, embodiments of the invention allow for a virtual aggregation of mobile enablers, supporting functions, drivers and signaling that can be performed across different mobile network operators or different access networks.

While there is much hype about the potential of mobile devices and mobile applications to dramatically change the business world as we know it today, the fact of the matter is mobile applications have not been widely adopted by enterprises. Several reasons for the lack of adoption include security concerns, total cost of ownership for an enterprise to provision, support and manage a fleet of mobile devices and the impossibility to manage integration and agreements with a wide variety of mobile network operators (MNOs) thereby limiting the effective area of use for many mobile devices. Thus, despite recognizing a value and need for mobilizing a workforce, these factors combine in a manner that makes it difficult for an enterprise's information technology (IT) department to accurately identify the total cost of ownership and the return on investment associated with deploying such devices throughout the entire organization.

These same issues also limit the capability of third parties that develop applications for the mobile market. Such third parties need to repeat integration processes and reach agreements with multiple mobile network operators in order to ensure the largest possible market and ensure that each MNO supports roaming features for the third party's applications. Moreover, as different MNOs role out new mobile enablers (e.g., location services, mobile payment services, etc.), third party developers need to update their applications to support the new enablers for each MNO.

Despite the difficulty associated with integrating new mobile enablers into third party applications, MNOs are in a particularly competitive market that requires new features to be implemented on a regular basis or the MNO will not appear competitive within the marketplace and may lose market share to other MNOs who regularly adopt new features/enablers. Implementing new enablers is time consuming and expensive. Thus, the investments MNOs must make in order to "remain competitive" may be jeopardizing their financial health and future. The problem is exacerbated by the fact that many enterprises are slow to adopt mobile services due to the problems discussed above.

BRIEF SUMMARY OF THE INVENTION

Systems and methods are disclosed for a virtual mobile service provider. In one embodiment, the method comprises providing first mobile service enabler for a first mobile service and a second mobile service enabler for a second mobile service. The mobile services enabled by a mobile service enabler may include text messaging services, multimedia messaging services, voice call services, location services, identity management services, accounting services (e.g., billing services), session management services, location services to locate a mobile device, and other types of services. Each of the mobile service enablers has an interface (e.g., web services) using a first format (e.g., XML) for communicating with content providers. The method further includes providing a plurality of drivers. Each of the drivers is configured to adapt communications received from the first and second mobile service enablers to a wireless network communications format associated with a wireless network access provider in communications with the respective driver.

The method may further comprise receiving a communication at the first mobile service enabler. The communication is received in the first format and may be associated with a user address. A driver associated with the first wireless network access provider is selected and the communication is adapted, using the selected driver, to a wireless network communications format associated with the wireless network access provider (e.g., GSM, CDMA, WiFi, GPRS, etc.). The adapted communication is then transmitted to the wireless network access provider.

The selection of the drive may include a determination of which wireless network access provider is communicating with a mobile device associated with a user address associated with the communication. A variety of techniques may be employed to make this determination. In one embodiment, the determination may comprise searching a knowledge base mapping user addresses to wireless network access providers. In another embodiment, the determination may comprise retrieving a list of wireless network access providers associated with the user address. The list may indicate a priority of probable wireless network access providers in communication with the mobile device. An inquiry may then be sent to a first probable wireless network access provider priority indicated by the list checking whether the first probable wireless network access provider is in communications with the mobile device. If the wireless network access provider is not communicating with the mobile device, an inquiry may be sent to the next priority access provider until one is found that is in communications with the mobile device or the list is exhausted.

In one embodiment, a second communication in the first format may be received at the first mobile service enabler. The second communication may be associated with a second user address. A second wireless network access provider may be determined to be communicating with a second mobile device associated with the second user address. A second one of the plurality of drivers is selected which is associated with the second wireless network access provider and the second communication is adapted, using the second driver, to a second wireless network communications format associated with the second wireless network access provider. The adapted second communication is then transmitted, using the second driver, to the second wireless network access provider.

In a second embodiment, a system is disclosed which comprises a first interface to communicate with a first subset of content providers and a second interface to communicate with a second subset of content providers. The system also includes a first mobile service enabler, communicatively coupled with the first interface and a second mobile service enabler, communicatively coupled with the second communications interface. The first and second mobile service enablers each provide a first interface for a mobile service. The system further comprises a plurality of drivers, communicatively coupled with the first mobile service enabler and the second mobile service enabler. Each of the drivers is configured to adapt communications received from the first and second mobile service enablers to a wireless network communications format associated with a wireless network access provider. The drivers are further configured to communicate with the respective wireless network access provider.

In a third embodiment, at least one machine-readable medium, having instructions stored thereon, which, when executed by a machine, cause the machine to perform actions is disclosed. The machine readable medium(s) includes instructions which cause the machine to perform the actions of providing a first mobile service enabler for a first mobile service, the mobile service enabler having a first interface using a first format for communicating with a first set of content providers; and providing a second mobile service enabler for a second mobile service, the second mobile service enabler having a second interface using the first format for communicating with a second set of content providers. Additionally, the machine-readable medium(s) includes instructions which causes the machine to perform the actions of providing a plurality of drivers, each of the drivers configured to adapt communications received from the first and second mobile service enablers to a wireless network communications format associated with a wireless network access provider in communications with the respective driver.

A further understanding of the nature and advantages of the present invention may be realized by reference to the remaining portions of the specification and the drawings.

DETAILED DESCRIPTION OF THE INVENTION

Figure 1:
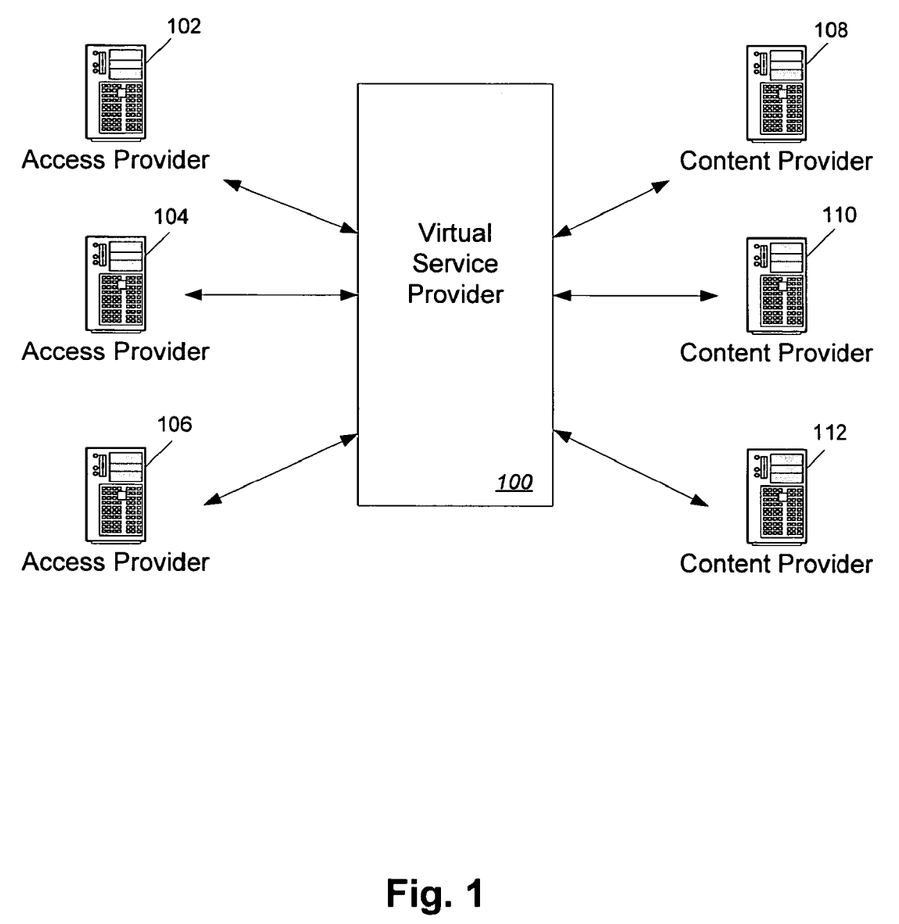
FIG. 1 is a block diagram that depicts the relationship of a virtual mobile service provider to content providers and mobile network operators according to one embodiment of the present invention.

FIG. 1 illustrates an exemplary embodiment of the relationship of a virtual mobile service provider (VMSP) 100 to wireless network access providers 102, 104, 106 (also referred to herein sometimes as "access provider"). By way of example, a wireless network access provider may be a mobile network operators (MNO), or a wireless network provider, such as a provider of WLAN (Wireless LAN) technology (e.g., WiFi provider). Each wireless network access provider 102, 104, 106 may have hundreds or thousands of various mobile devices (not shown in FIG. 1) that use the wireless network to access internet-based applications and/or services.

Embodiments of the invention employ a VMSP 100 as a gateway between the access providers 102, 104, 106 and content providers 108, 110, 112 (also referred to herein sometimes as "service provider"). By way of example, content providers 108, 110, 112 may be application service providers providing services to clients of the respective content provider, application service providers providing services to mobile devices, business entities or other types of enterprises. The VMSP 100 may be implemented by an existing access provider, a federation of access providers or a third party. Alternately, the VMSP may be implemented by an enterprise or content provider for their own use or applications. As will be described in further detail below, VMSP 100 may provide standardized application level interfaces that may be used for the development of applications so that content providers can distribute applications, services and content across a plurality of different mobile and fixed networks that rely on different protocols.

In some embodiments, the content provider using VMSP 100 may be providing a service to mobile devices. Requests from mobile devices may be sent via each access provider 102, 104, 106 to VMSP 100 prior to being sent to the particular content provider 108, 110, 112 that provides the requested application and/or services. VMSP 100 may then receive and adapt the request to a common interface format shared between the VMSP 100 and the content providers. In one embodiment the request is adapted using application level interface descriptions stored in a database connected to a server or other appropriate computer within VMSP 100. The adapted request is then sent from the VMSP 100 to the particular content provider 108, 110, 112 that provides the requested service or application. In response to receiving the request, an individual content provider 108, 110, 112 responds to VMSP 100 with the requested services and/or application. VMSP 100 receives the response and adapts it into a format acceptable to the particular wireless network access provider 102, 104, 106 through which the mobile device requested the service. It should be appreciated that in other embodiments, communications may also be initiated by content providers 108, 110, 112 (e.g., to provide services, such as a location or text messaging service to clients of the content provider).

As will be described in greater detail below, VMSP 100 may contain an aggregation of multiple mobile service enablers that enable mobile services. Content providers 108, 110, 112 may communicate with a mobile service included in VMSP 100 using a common interface. In one embodiment, the interfaces to mobile service enablers may be deployed as web service interfaces to the content providers 108, 110, 112. By using a common interfaces, the mobile services provided by VMSP 100 may be abstracted from the details of the wireless network technologies employed by the access providers 102, 104, 106. Thus, VMSP 100 may provide content providers 108, 110, 112 that develop mobile services and applications using the common interfaces with immediate integration with enablers for multiple access provider networks.

Figure 2:
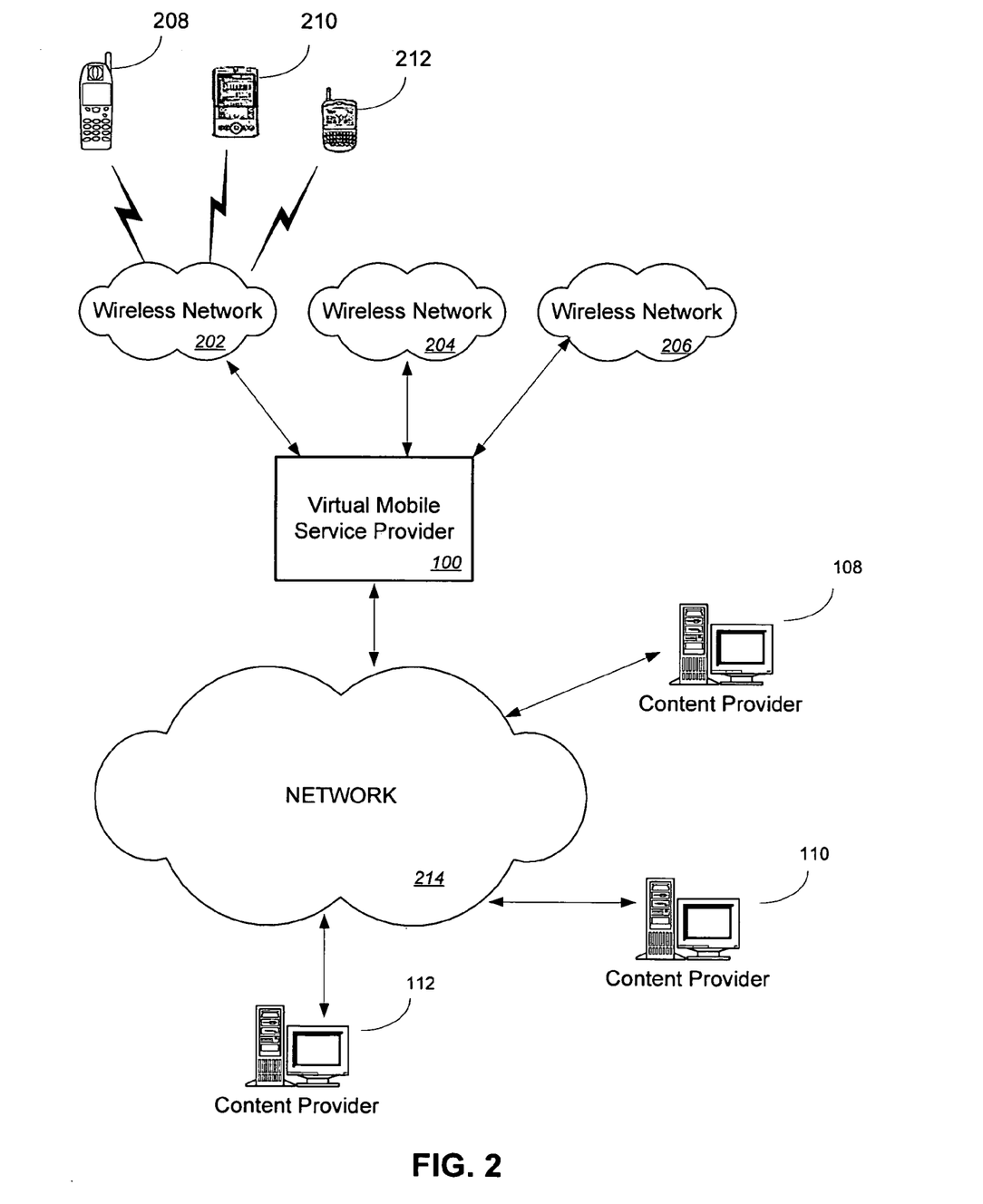
FIG. 2 illustrates a system for enabling content providers to communicate with mobile devices through a virtual mobile service provider according to one embodiment of the present invention.

FIG. 2 illustrates an overview diagram of an embodiment of communications with virtual mobile service provider 100. In FIG. 2, a number of wireless mobile devices 208, 210, 212 are communicatively coupled to wireless network 202. Wireless mobile devices 208, 210, 212 may be mobile telephones, personal data assistants (PDA) with wireless capabilities, laptops with wireless capabilities, wireless devices for receiving email communications (e.g., Blackberry® devices), or other types of wireless device. Also shown are wireless networks 204, 206, each of which has additional wireless mobile devices (not shown) connected thereto. Each wireless network 202, 204, 206 may employ a different communication format. For instance, wireless technology formats that may be used by an access provider include Code Division Multiple Access (CDMA), Global System for Mobile Communication (GSM), WiFi (IEEE 802.11), General Packet Radio Service (GPRS), and other wireless network technologies. In addition to the wireless technology format employed by the wireless network 202, 204, 206, each wireless network 202, 204, 206 may also employ proprietary standards for communications. Together, these proprietary standards and technology formats employed by the wireless network 202, 204, 206 of an access provider may be collectively referred to herein as a wireless network communication format.

Mobile devices 208, 210, 212 communicate with VMSP 100 via an access provider 102, 104, 106 to the wireless network 202, 204, 206. VMSP 100 may be used to send communications from mobile devices via access providers 102, 104, 106 over wireless networks 202, 294, 206 to content providers 108, 110, 112. Additionally, VMSP 100 may be used to send communications from content providers 108, 110, 112 to mobile devices in communications with access providers 102, 104, 106. In one embodiment, VMSP 100 may communicate with content providers 108, 110, 112 over a public wide-area-network 214 such as the Internet. In alternate embodiments, network 214 may be any other network, such as a virtual private network, a local area network, or the like.

As will be described further below, content providers 108, 110, 112 may provide web services to wireless devices 208, 210, 212. Thus, content providers 108, 110, 112 may enable services such as user authentication services, user authorization services, user accounting and billing services, user personalization services, and the like. Content providers 108, 110, 112 may be embodied as a traditional web servers coupled via wires to network 214. Alternately, content providers 108, 110, 112 may be embodied as any system that provides services to wireless devices 20–24. Content providers 108, 110, 112 may alternately or additionally provide services to clients (not shown) of content providers 108, 110, 112. These services may include presence related services, location services, communication services (e.g., messaging or phone call services), or other types of services.

VMSP 100 may thus act as a gateway between access providers 102, 104, 106 and content providers 108, 110, 112 that securely integrates, delivers and manages in-house and third party applications and content. VMSP 100 may also allows content providers 108, 110, 112 to distribute applications, services and content across a plurality of different mobile and fixed networks that rely on different protocols. VMSP 100 may be transparent to mobile devices 208, 210, 212, that is, the users of the mobile devices 208, 210, 212 may think they are exchanging information directly through the access provider 102, 104, 106 using communications that are formatted to work with the access provider's proprietary network 202, 204, 206. Instead, however, the mobile devices are exchanging information through VMSP 100 and VMSP 100 automatically handles formatting necessary to ease communication between each access provider 102, 104, 106 and content providers 108, 110, 112.

Figure 3:
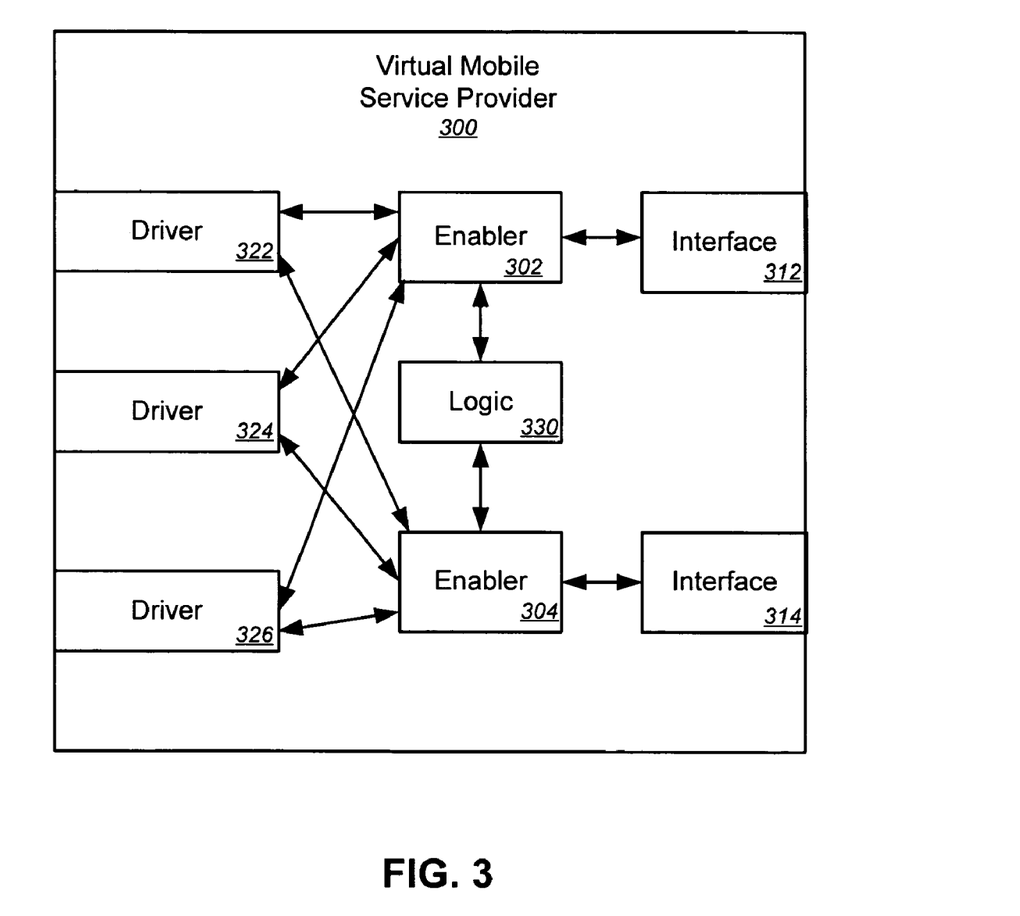
FIG. 3 is a block diagram illustrating an exemplary embodiment of a virtual mobile service provider.

FIG. 3 illustrates an exemplary virtual mobile service provider 300 that may be used to provide a virtual aggregation of mobile enablers, supporting functions and drivers across different access networks 202, 204, 206. VMSP 300 includes a plurality of mobile service enablers 302, 304 that may be used to provide a mobile service. By way of example, mobile services may include messaging services (e.g., text messages, multi-media messages, email, instant messaging), abstract multi-channel messaging, actionable notifications (notifications that may be answered via message or other actions), reverse ask (service able to answer a message and maintain a message based dialog with a user), voice routing and call control services, streamed audio/voice channel and signaling (e.g., voice chat), streamed multimedia and signaling, data synchronization, location services to locate a mobile device, presence related services to determine whether a user address associated with a mobile device is in communications with an access provider, push/get services, accounting services (e.g., billing, charging, rating), device management services, payment and M-commerce services, session management services, multimodal synchronization services, user personalization services (to provide profile and preference information for a user to content providers), identity management services (i.e., to mask a user's identity from content providers), security services, data authentication services, and administration services. As can be appreciated a wide variety of additional services not mentioned, such as any type of service or capability that may be exposed by an access provider or devices on the access provider's network, may also be provided by an enabler 302, 304.

Each of the enablers 302, 304 may employ an interface 312, 314 to expose its mobile service to the content providers 108, 110, 112 and otherwise communicate with the content providers. In one embodiment, one or more of the interfaces 312, 314 may be web services interfaces to the Internet. In alternate embodiments, one or more of the interfaces 312, 314 may be application program interfaces (APIs) providing a programming interface, such as a Java interface to the enablers 302, 304. Additionally, in some embodiments, the interfaces may be compliant with standards such as Parlay, JAIN, Open Mobile Architecture (OMA), and/or Java Community Process (JCP) standards.

VMSP 100 additionally includes a plurality of drivers 322, 324, 326. Each driver 322, 324, 326 may communicate with one or more access providers 102, 104, 106. The drivers 322, 324, 326 may employ an application programmable interface (API) for communicating with the access providers using a particular technology, such as CDMA, GSM, etc. Thus, one driver 322, 324, 326 may be used to communicate with multiple access providers using the same wireless technology. Alternately, in some instances, drivers 322, 324, 326 may be used to communicate with a single access provider to provide support of non-standard communication formats. The drivers 322, 324, 326 may be used to adapt communications received from the enablers 302, 304 to a wireless network communications format associated with an access provider 202, 204, 206 in communication with the respective driver 322, 324, 326. In some instances, the drivers may communicate with network specific enablers provided by an access provider. Additionally, the drivers 322, 324, 326 may be used to adapt communications received from the access providers to the interface format employed by enablers 302, 304. Drivers 322, 324, 326 may be shared between multiple enablers 302, 304. Alternately, each enabler 302, 304 may have its own set of drivers.

VMSP 100 may further include logic 330 to provide support functionality to one or more enablers 302, 304. Support functions may include load balancing, monitoring, fault detection, authentication, authorization, charging/billing, logging, identity management, prioritization based on service level agreements or other criteria, and other types of support functions. Additionally, in some embodiments logic 330 may be used to assist an enabler 302, 304 to select the appropriate driver to send communications received from a content provider.

Logic 330 and/or enablers 302, 304 may select a driver to send a communication from content provider based on a determination as to which wireless network access provider is in communications with a mobile device. This determination may be made using a data storage communicatively coupled to logic 330 and/or enablers 302, 304 (possibly via logic 330) which stores mappings between user addresses and access providers 102, 104, 106. Alternately, the data storage may store a list of wireless access providers associated with addresses. The list may be prioritized to indicate a priority of probable wireless network access providers in communication with the mobile device associated with the user address. For instance, access providers associated with a home network of the user may be ordered first. Logic 330 and/or enablers 302, 304 may retrieve the list and traverse the access providers in order until one is found which is in communication with a mobile device associated with the user address. This information may be retained for future communications over a predetermined time period or until an indication is received from an access provider that it is no longer in communications with a mobile device associated with the user address. In alternate embodiments, other techniques may be used by logic 330 or enablers 302, 304 to determine the access provider in communication with a mobile device associated with a user address. For instance, broadcast messages may be sent to each of the drivers asking if the user is on the network or roaming information may be retrieved directly from an access provider. Other appropriate techniques may also be used.

Thus, as described above, VMSP 300 provides a virtual aggregation of mobile services exposed by the interfaces 312, 314 of enablers 302, 304. Drivers 322, 324, 326 are used to provide communications between content providers using the interfaces 312, 314 and multiple access providers 102, 104, 106 using different wireless communication formats. It should be appreciated that VMSP 300 may include more enablers 302, 304 than illustrated in FIG. 3. Additionally, in some embodiments, the functionality of VMSP 300 may be distributed across a distributed network.

Figure 4:
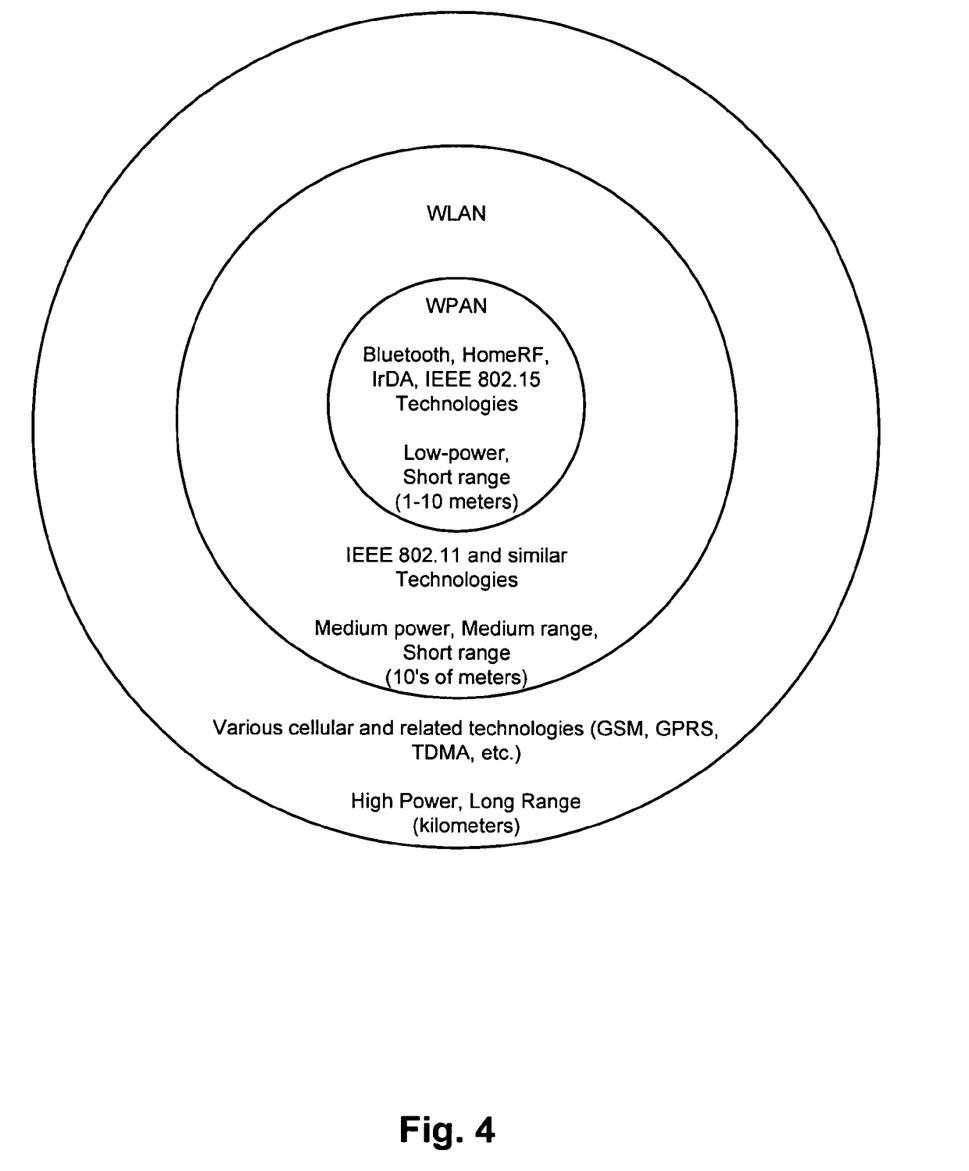
FIG. 4 illustrates a simplified comparison of several currently available mobile network technologies.

FIG. 4 illustrates exemplary wireless network technologies which may be used by an access provider. Wireless network technologies include wireless wide area network (WWAN), wireless local area network (WLAN) and wireless personal area network (WPAN) technologies. WWAN technologies typically include cellular and related technologies such as GSM, GPRS, CDPD, CDMA, TDMA, WCDMA, etc. WWAN networks are high power, long range networks that typically have an access range on the order of several kilometers on up. WLAN technologies, on the other hand, are medium power, medium range networks that have an access range on the order of tens of meters while WPAN networks are low power, short range networks that typically have an access range of about 10 meters or less. Examples of WLAN technologies include the IEEE 802.11(a), (b), (e) and (g) technologies and examples of WPAN technologies include Bluetooth, HomeRF, IrDA and IEEE 802.15 technologies.

Figure 5:
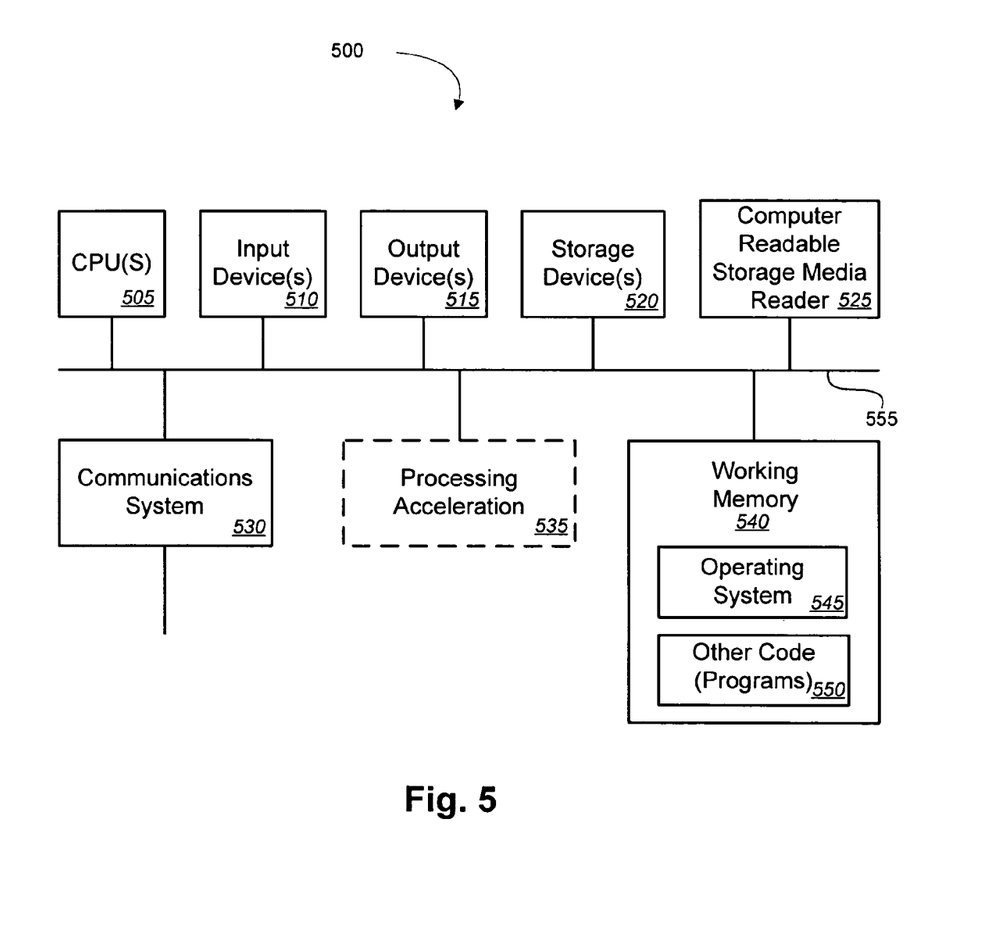
FIG. 5 is a block diagram of a computer system upon which a virtual mobile service provider may be implemented.

FIG. 5 illustrates one embodiment of a computer system 500 upon which a VMSP 300 (or components of a VMSP) may be implemented. The computer system 500 is shown comprising hardware elements that may be electrically coupled via a bus 555. The hardware elements may include one or more central processing units (CPUs) 505; one or more input devices 510 (e.g., a mouse, a keyboard, etc.); and one or more output devices 515 (e.g., a display device, a printer, etc.). The computer system 500 may also include one or more storage device 520. By way of example, storage device(s) 520 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 525; a communications system 530 (e.g., a modem, a network card (wireless or wired), an infra-red communication device, etc.); and working memory 540, which may include RAM and ROM devices as described above. In some embodiments, the computer system 500 may also include a processing acceleration unit 535, which can include a DSP, a special-purpose processor and/or the like The computer-readable storage media reader 525 can further be connected to a computer-readable storage medium, together (and, optionally, in combination with storage device(s) 520) comprehensively representing remote, local, fixed, and/or removable storage devices plus storage media for temporarily and/or more permanently containing computer-readable information. The communications system 530 may permit data to be exchanged with a network and/or any other computer.

The computer system 500 may also comprise software elements, shown as being currently located within a working memory 540, including an operating system 545 and/or other code 550, such as an application program. The application programs may implement an identity provider, components of the identity provider, and/or the methods of the invention. It should be appreciate that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Figure 6:
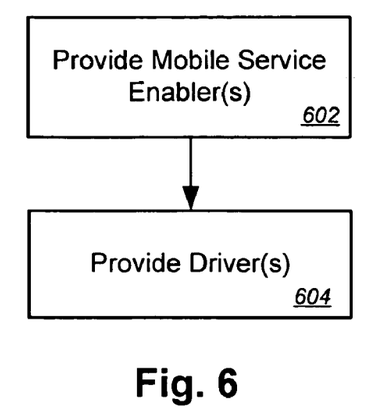
FIG. 6 is a flow diagram illustrating an exemplary method of enabling mobile services using a virtual mobile service provider.

FIG. 6 illustrates an exemplary method that may be used to virtualize mobile services. The method includes providing 602 a plurality of mobile service enablers. Each of the mobile service enablers 602 may have an interface for exposing a mobile service to content providers. In one embodiment, the interface may be a web services interface employing Extended Markup Language (XML) to exchange communications between the mobile service enablers and content providers. A variety of different types of mobile services may be provided by a mobile service enabler. For instance, mobile services may include accounting services, such as billing services that may be used to charge a user for services provided by a content provider; payment services that may be used by a user of a mobile device to provide payment to a content provider; messaging services (e.g., text messaging, multimedia messages), identity management services that may be used to mask user identities from content providers; authorization and authentication services to authorize and authenticate users; user personalization services to manage user preferences and profile information; location services to locate a mobile device; push and pull services to send communications to mobile devices; voice call services (e.g., phone calls, voice chat, voice over IP, etc.); control and signaling for streaming audio/voice channels and/or multimedia; and other types of services that may be provided to mobile devices and/or content providers that communicate with mobile devices.

The method further includes providing 604 a plurality of drivers. Each of the drivers communicates with one or more access providers. The drivers adapt communications received from mobile services enablers to a wireless communication format associated with its respective access provider(s). By way of example, the drivers may adapt communications by changing the data format from the interface format to a format supported by the access provider, may map communications from the virtual interface to an access provider interface, may change parameters (remove/add) parameters, or may make a combination of calls to multiple enablers located in an access provider's network. Drivers may exist for multiple wireless network technologies, such as CDMA, GSM, WiFi, GPRS, EDGE, 3G, 2.5G, and many other technologies.

Figure 7:
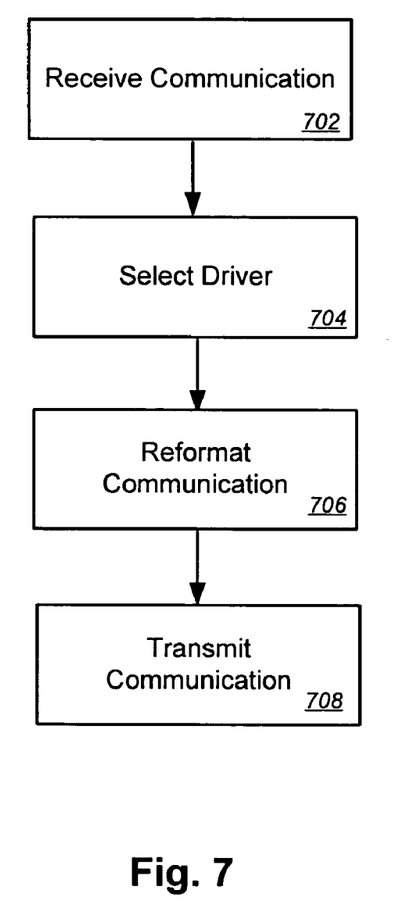
FIG. 7 is a flow diagram illustrating an exemplary method of communications using a virtual mobile service provider.

FIG. 7 illustrates an exemplary method of communications between content providers and access providers using a virtual mobile service provider. A mobile service enabler receives 702 a communication from a content provider. The communication is received in a first format, such as XML. The communication may be any type of communication from the content provider related to the mobile services provided by the mobile service enabler. As one example, the mobile service may be a text messaging service and the first communication may include a text message in the first format which is to be transmitted to a user address associated with a mobile device. As another example, the mobile service provided by the enabler may be a multi-media messaging service; thus, the communication may include a multi-media message in the first format to be transmitted to a user address. As a third example, the mobile service may be a voice call service and the first communication may include call setup information for a voice call to be initiated with the user address (e.g., mobile identification number). As a fourth example the VMSP may aggregate presence information for multiple access providers. The communication may be a request to obtain presence information for a user. A variety of other types of communications related to the mobile service offered by the mobile service enabler may also be received from content provider.

The mobile service enabler may select 704 a driver to use to adapt and transmit the communication to the access provider, in some instances for delivery to a mobile device associated with a user address. In some instances, the driver may adapt the communication to the format supported by an enabler located in the access provider's network. The communication may be associated with a user address. In these embodiments, the selection of the driver may include a determination of which access provider is communicating with a mobile device associated with the user address. A variety of techniques may be employed to make this determination. As one example, a knowledge base may be searched which maps user addresses to wireless network access providers. As another example, a list of access providers associated with the user address may be retrieved. The list may be ordered (or otherwise indicate) with a priority of probable wireless network access providers in communication with the mobile device. The mobile service enabler may send an inquiry to the first priority access provider, via the driver in communication with the first access provider, checking whether the access provider is in communications with a mobile device associated with the user address. The list of access providers may be traversed until an indication is received from an access provider that it is communicating with a mobile device associated with the user address. It should be appreciated that a variety of other types techniques, such as broadcast messages, may be used to determine which access provider is communicating with the destination mobile device (and select the driver accordingly).

The selected driver may then be used to adapt 706 the communication for delivery to the access provider or to the mobile device associated with a user address (via access provider). For instance, a text message communication may be adapted to a text message format supported by the access provider (e.g., Short Message Peer-to-Peer (SMPP), or as a SOAP message for a Web Service interface to a messaging server. As another example, the driver may adapt call setup information received from the mobile service enabler to setup a streaming voice channel (e.g., phone call) with a mobile device. Other types of communications may also be adapted by a driver for delivery to an access provider.

As previously described, the driver may adapt the communication in a variety of ways. For instance, the actual format of the message may be reformatted from one data format (e.g., XML) to a second message format (e.g., SMPP). As another example, the communication may be adapted based on a mapping of the virtual interface to an access provider network specific interface. Parameters in the communication may be changed, added, or removed. Additionally, the driver may adapt the communication to the network specific format by making a combination of calls to multiple enablers located in the access provider's network.

After the communication has been adapted, the driver transmits 708 the adapted communication to the access provider. As previously described, in some instances the adaptation of the communication may result in multiple messages being sent. In some embodiments, the access provider may then further the communication on to a mobile device associated with the user address indicated by the communication. The method may be repeated for additional communications received 702 at an enabler.

For purposes of illustration, the method was described in reference to communications received for the user. It should be appreciated that the method may also be used to send communications to a enabler located in the wireless network or other type of service provider. As an example, in one embodiment, the enabler may be providing a service, such as a location service to content providers. Thus, a communication may be received 702 in a first format. The communication may then be sent to a selected driver 704 for adaptation 706 from the first format to a wireless communication format supported by the access provider to request the location of a mobile device associated with a user address. The adapted message may be transmitted 708 to the access provider ((e.g., to a network specific enabler). Subsequently, a location message in the wireless communication format used by the access provider may be received from the access provider. The location message may indicate the location of the mobile device. The driver may then adapt the communication to be in the first format and transmit the communication to the mobile service enabler for transmittal to the requesting content provider.

In other embodiments, the VMSP may adapt communications received from access providers in the communication format employed by the access provider to the common interface format used to communicate with content providers. Thus, a device or enabler in a particular network may send communications to an address which the VMSP maps to a content provider. The VMSP may then adapt and otherwise process the communication for transmittal to the content provider.

Communications may also be sent from an access provider directly to the VMSP. For instances, in embodiments in which the VMSP aggregates presence, presence changes may be sent to the VMSP. The VMSP may also be used to facilitate communications between access providers. Thus, an enabler or device in one wireless network may send a communication to a VMSP driver. The VMSP may then adapt the communication for transmittal to an enabler in a different wireless network.

In the foregoing description, for the purposes of illustration, methods were described in a particular order. It should be appreciated that in alternate embodiments, the methods may be performed in a different order than that described. Additionally, the methods may include fewer, additional, or different blocks than those described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art

What is claimed is:

1. A method comprising:
    providing a first mobile service enabler for a first mobile service, the mobile service enabler having a first interface using a first format for communicating with a first set of content providers;
    providing a second mobile service enabler for a second mobile service, the second mobile service enabler having a second interface using the first format for communicating with a second set of content providers;
    providing a plurality of drivers, each of the drivers configured to adapt communications received from the first and second mobile service enablers to a wireless network communications format associated with a wireless network access provider in communications with the respective driver;
    receiving a first communication at the first mobile service enabler, the first communication in the first format, the first communication associated with a user address;
    selecting a driver associated with a first wireless network access provider;
    adapting the first communication, using the selected driver, to a first wireless network communications format associated with the first wireless network access provider; and
    transmitting the adapted communication, using the selected driver, to the first wireless network access provider.

2. The method of claim 1, wherein selecting the driver comprises determining the first wireless network access provider is communicating with a mobile device associated with the user address.

3. The method of claim 2, wherein determining the first wireless network access provider is communicating with the mobile device comprises searching a knowledge base mapping user addresses to wireless network access providers.

4. The method of claim 2, wherein determining the first wireless network access provider is communicating with the mobile device comprises:
    retrieving a list of wireless network access providers associated with the user address, the list indicating a priority of probable wireless network access providers in communication with the mobile device;
    sending an inquiry to a first probable wireless network access provider priority indicated by the list, the inquiry checking whether the first probable wireless network access provider is in communications with the mobile device.

5. The method of claim 2, wherein the first mobile service comprises a text messaging service and wherein receiving the first communication comprises receiving a text message, in the first format, to be transmitted to the user address.

6. The method of claim 5, wherein adapting the first communication comprises adapting the communication to a text message format supported by the first wireless network access provider.

7. The method of claim 1, wherein the first mobile service comprise a multi-media messaging service and wherein receiving the first communication comprises receiving a multi-media message, in the first format, to be transmitted to the user address.

8. The method of claim 1, wherein the first mobile service comprises a voice call service and wherein receiving the first communication comprises receiving call setup information in the first format for a voice call to be transmitted to the user address.

9. The method of claim 8, further comprising, with the first mobile service enabler, setting up the voice call using the selected driver.

10. The method of claim 1, wherein adapting the first communication comprises reformatting the communication to one of GSM and CDMA.

11. The method of claim 1, wherein adapting the first communication comprises reformatting the communication to one of General Packet Radio Service (GPRS) provider and WiFi.

12. The method of claim 1, wherein the first wireless network access provider is a mobile network operator (MNO).

13. The method of claim 1, further comprising:
    receiving a second communication at the first mobile service enabler, the second communication in the first format, the second communication associated with a second user address;
    determining a second wireless network access provider in communication with a second mobile device associated with the second user address;
    selecting a second one of the plurality of drivers, the second driver associated with the second wireless network access provider;
    adapting the second communication, using the second driver, to a second wireless network communications format associated with the second wireless network access provider;
    transmitting the adapted second communication, using the second driver, to the second wireless network access provider.

14. The method of claim 1, wherein the first mobile service comprises one of a text messaging service and a multimedia service.

15. The method of claim 1, wherein the first mobile service comprises an identity management service.

16. The method of claim 1, wherein the first mobile service comprises a voice call service.

17. The method of claim 1, wherein the first mobile service comprises a billing service.

18. The method of claim 1, wherein the first mobile service comprises a session management service.

19. The method of claim 1, wherein a first one of the plurality of drivers is a driver to a wireless network access provider using CDMA and a second one of the plurality of drivers is a driver to a wireless network access provider using GSM.

20. A method comprising:
providing a first mobile service enabler for a first mobile service, the mobile service enabler having a first interface using a first format for communicating with a first set of content providers, the first mobile service including a location service;
providing a second mobile service enabler for a second mobile service, the second mobile service enabler having a second interface using the first format for communicating with a second set of content providers;
providing a plurality of drivers, each of the drivers configured to adapt communications received from the first and second mobile service enablers to a wireless network communications format associated with a wireless network access provider in communications with the respective driver;
receiving a request, in the first format, at the first mobile service enabler to determine a location of a wireless mobile device associated with a user address;
adapting the request to the first wireless communications format associated with a first wireless network access provider, the first wireless network access provider in communications with the wireless mobile device;
transmitting the adapted request to the wireless network access provider;
receiving a location message indicating the location from the wireless network access provider, the location message in the first wireless network communications format;
adapting the location message to the first format; and
transmitting the adapted location message.

21. The method of claim 20, wherein the first interface is a web services interface.

22. The method of claim 21, wherein the first format is Extended Markup Language (XML).

* * * * *

UNITED STATES PATENT AND TRADEMARK OFFICE
CERTIFICATE OF CORRECTION

| | |
|---|---|
| PATENT NO. | : 7,209,734 B2 |
| APPLICATION NO. | : 10/883116 |
| DATED | : April 24, 2007 |
| INVENTOR(S) | : Stephane H. Maes |

It is certified that error appears in the above-identified patent and that said Letters Patent is hereby corrected as shown below:

At column 12, line 17, delete "method of claim 2"

and substitute with

-- method of claim 1 --.

Signed and Sealed this

Sixteenth Day of October, 2007

JON W. DUDAS
*Director of the United States Patent and Trademark Office*